United States Patent Office 3,519,416
Patented July 7, 1970

3,519,416
QUATERNARY BRAZING ALLOY COMPOSITION
Howard Mizuhara, San Mateo, Calif., assignor to Western Gold & Platinum Company, Belmont, Calif., a corporation of California
No Drawing. Filed Jan. 5, 1968, Ser. No. 695,847
Int. Cl. C22c 9/06, 5/00
U.S. Cl. 75—134                     5 Claims

ABSTRACT OF THE DISCLOSURE

Brazing alloy compositions containing in percent by weight 25–65% copper, 10–40% gold, 5–15% indium and 10–40% of an alloy element selected from nickel and cobalt. The alloy is especially useful in joining operations where high oxidation resistance is required at elevated temperatures.

---

This invention relates to quaternary brazing alloys and more particularly to new brazing alloy compositions having high oxidation resistance at elevated temperatures.

Brazing is defined broadly as the joining of metal members (hereinafter referred to as base members) through the use of a non-ferrous metal having a lower melting point than the metal members being joined. Brazing processes are widely used in the industry for the fabrication of parts from a variety of metals and alloys. In operation, the brazing metal is disposed at those locations between adjacent base members where brazing is required. The resulting assembly is then heated to an elevated temperature that is at least in excess of the solidus temperature of the brazing alloy, and preferably above the liquidus temperature of the brazing alloy. Under these temperature conditions, the molten brazing alloy is distributed by capillary attraction between the closely fitted surfaces of the base members being joined. When the assembly is cooled below the solidus temperature of the brazing alloy, a bond is provided between the base members and the brazing alloy that retains the assembly in the desired configuration under loading.

Conventional brazing operations have heretofore employed pure metals such as copper, nickel, or silver as well as various alloys formed from these and other metals; see, for example, the Encyclopedia of Chemical Technology, The Interscience Encyclopedia, Inc., 1947, pp. 555–584, vol. 1. In each instance, it is essential for the alloy system selected to wet the base members, i.e., to adhere to the base members by alloying and diffusion. As previously stated, it is also necessary to provide a brazing alloy having a liquidus temperature below the solidus temperature of the base members, to prevent degradation or deformation of the base members being joined. Conversely, if the solidus temperature of the brazing alloy is too low, i.e., below the temperature at which the brazed assembly will be employed, the brazing alloy would fuse during the employment of the brazed assembly at such elevated temperatures. Therefore, selection of an appropriate brazing alloy is usually dependent upon the conditions to be encountered during the use of the resulting brazed assembly.

Previously, where a special alloy having high resistance to atmospheric corrosion (low oxidation permeability) has been required, an alloy having a high concentration of gold has been employed. Gold is not susceptible to contamination by oxygen, carbon, sulfur or nitrogen at any elevated temperature. Alloys containing a large concentration of gold are also malleable and therefore easily deformed. As a result, such alloys are frequently utilized in the preparation of corrosion-resistant shapes of intricate design. However, their use as brazing alloys is limited by economic considerations as well as the inherent poor tensile strength produced. More recently, brazing alloys containing appreciable concentrations of gold, yet retaining satisfactory tensile strength at elevated temperatures and high vacuum conditions have been developed for joining base members; see, e.g., U.S. Pat. 2,813,790 where an alloy of gold and copper with minor amounts of indium and nickel is disclosed for use at elevated temperatures and under high vacuum. However, inexpensive brazing alloys that are useful in an oxidizing environment are not presently available.

Thus, it is a principal object of this invention to provide an economical brazing alloy having low oxidation permeability in an oxygen-containing environment at elevated temperatures.

It is a further object of this invention to provide a brazing alloy suitable for joining base members at the elevated temperatures required for various heat treating processes conventionally performed on the base members.

It is a related object of this invention to provide a brazing alloy that has a solidus temperature below about 1700° F.

It is still another object of this invention to provide a brazing alloy that retains a tensile strength of at least 10,000 pounds per square inch even at temperatures of about 1000° F.

Broadly stated, the present invention is directed to high strength brazing alloys that incur little oxidation permeation during prolonged periods of retention at elevated temperatures in an oxygen-containing environment such as the atmosphere. It has now been found that when a quaternary brazing alloy stream is formed of copper, gold, indium and a member selected from nickel and cobalt, in proportions as hereinafter set forth, the resulting high strength alloy provides the desired oxidation resistance characteristics required even at elevated temperatures such as 1000° F. or higher, and prolonged periods of time such as in excess of 1000 hours. Such compounds are especially useful for brazing compressor, rotor and/or stator blades in gas-turbine engines. Furthermore, the alloys of this invention are also useful in structural assemblies such as honeycomb that are often employed at elevated temperatures such as in spacecrafts.

The brazing alloy of this invention contains, in percent by weight, 25–65% copper, 10–40% gold, 5–15% indium and 10–40% of an alloy selected from nickel and cobalt. Such a quaternary system has been found to retain a tensile strength in excess of 10,000 pounds per square inch at temperatures in excess of about 1000° F. while exhibiting low oxidation permeability, as demonstrated by an oxygen weight gain of less than 3 milligrams per centimeter squared, during extended periods of time such as 1000 hours.

In a preferred aspect, quaternary brazing alloys including, in percent by weight, 40–50% copper, 15–30% gold, and 8–12% indium and 18–31% of an alloy element selected from nickel and cobalt, exhibit the aforementioned oxidation resistance characteristics even at 1200° F.

Although it is not intended that the invention be limited to any specific theoretical concept, it appears that indium in amounts up to 15% by weight advantageously reduce the liquidus temperature of a basic copper-nickel (or cobalt) alloy system. Additionally, the gold content, as well as the indium content, provide the necessary low oxidation permeability desired. Thus, the resulting brazing alloy has a low solidus temperature, low oxidation permeability, good wetting characteristics even with stainless steel and retains sufficient tensile strength at elevated temperatures to provide a rigid, permanent structural assembly.

Many metals require various high temperature treatments to obtain certain special properties for the ultimate product, such as ductility, hardness or toughness. The metal is not melted during such treatments, and both the rate and conditions of heating and cooling, as well as the time that the material is held at such elevated temperatures must be carefully regulated. Because, as previously set forth, the brazing alloys of this invention have a solidus temperature below 1700° F., they are especially advantageous when used for joining alloys that are subjected to heat treating techniques, and particularly in about the range of about 1700° F. to about 2200° F. In this manner, brazing can be accomplished simultaneously with various heat treating processes including stress-relieving, homogenizing, annealing and the like.

By way of example, the following specific brazing alloys were prepared by simple melting together of the various components. The alloys were found to provide the desired low-level oxidation permeation characteristics required at temperatures above 1000° F. and during prolonged periods such as 1000 hours or longer:

| Alloy No. | Weight percent | | | | Liquidus temp. °F. |
|---|---|---|---|---|---|
| | Copper | Gold | Indium | Nickel | |
| 1 | 57 | 10 | 10 | 23 | 1,950 |
| 9 | 60 | 10 | 10 | 20 | |
| 10 | 50 | 25 | 10 | 15 | 1,800 |
| 11a | 40 | 40 | 10 | 10 | |
| 15 | 32 | 40 | 10 | 18 | |
| 16 | 41 | 31 | 10 | 18 | 1,800 |
| 21 | 32 | 36 | 10 | 22 | 1,800 |
| 22 | 36 | 27 | 10 | 27 | |
| 23 | 41 | 22 | 10 | 27 | |
| 24 | 45 | 18 | 10 | 27 | 1,806 |
| 30 | 44.5 | 18 | 11 | 26.5 | 1,806 |

By way of further illustration of the novel brazing alloys of this invention, the following example is provided. It should be understood that the details thereof are not to be regarded as limitations as they may be varied as will be understood by one skilled in this art.

An alloy composed of 45% by weight of copper, 27% by weight of nickel, 18% by weight of gold and 10% by weight of indium (alloy No. 24 from the above table) was brazed between two stainless steel base members by subjecting the assembly to a temperature of about 1800° F. for about 10 minutes in an oxygen-free environment. The assembly was cooled to room temperature and weighed. The assembly was then heated in air to a temperature of about 1000° F. and maintained at that temperature for 1000 hours. At the end of this time period, while the assembly was still at the elevated temperature, it was subjected to a tensile force of 10,000 p.s.i. No permanent distortion of the assembly was observed. The assembly was then cooled to room temperature and then weighed. The weight gain resulting from the high-temperature exposure to air was found to be 1.19 milligrams/centimeter squared of exposed alloy surface. Oxidation penetration was found to be no greater than 0.001 inch.

While a number of embodiments have been described, it will be apparent that other adaptations and modifications can be made without departing from the true spirit and scope of the invention.

What is claimed is:

1. A quaternary brazing alloy having low oxidation permeability at elevated temperatures comprising, in percent by weight, 10–40% gold, 5–15% indium, 10–40% of an alloy element selected from the group consisting of nickel and cobalt, and the remainder copper.

2. A brazing alloy in accordance with claim 1, wherein the amount of copper is 25–65% by weight.

3. A brazing alloy in accordance with claim 2 comprising 40–50% copper, 15–30% gold, 8–12% indium and 18–31% of an alloy element selected from the group consisting of nickel and cobalt.

4. A brazing alloy in accordance with claim 3, wherein said alloy element is nickel.

5. A quaternary brazing alloy having low oxidation permeability at temperatures in excess of 1000° F. consisting essentially of, in percent by weight, about 45% copper, 18% gold, 10% indium and 27% nickel.

References Cited

UNITED STATES PATENTS

| | | | |
|---|---|---|---|
| 2,400,003 | 5/1946 | Hensel et al. | 75—165 X |
| 2,464,821 | 3/1949 | Ludwick et al. | 75—165 X |
| 2,596,454 | 5/1952 | Williams | 75—165 |
| 2,813,790 | 11/1957 | Hack | 75—159 X |
| 2,950,189 | 8/1960 | Ames | 75—134 |

CHARLES N. LOVELL, Primary Examiner

U.S. Cl. X.R.

75—153, 159